(12) United States Patent
Meister et al.

(10) Patent No.: US 7,015,411 B2
(45) Date of Patent: Mar. 21, 2006

(54) EROSION SYSTEM HAVING AN EROSION HEAD FOR REMOVING METALLIC CONNECTION ELEMENTS

(75) Inventors: Titus Meister, Mainburg (DE); Johann Bermann, Münchsmünster (DE); Anton Fischer, Ingolstadt (DE); Max Schmidtner, Manching (DE)

(73) Assignee: EADS Deutschland GmbH, Ottobrunn (DE)

( * ) Notice: Subject to any disclaimer, the term of this patent is extended or adjusted under 35 U.S.C. 154(b) by 57 days.

(21) Appl. No.: 10/483,829

(22) PCT Filed: Jul. 22, 2002

(86) PCT No.: PCT/DE02/02670

§ 371 (c)(1),
(2), (4) Date: Jul. 23, 2004

(87) PCT Pub. No.: WO03/013775

PCT Pub. Date: Feb. 20, 2003

(65) Prior Publication Data
US 2004/0238497 A1    Dec. 2, 2004

(30) Foreign Application Priority Data
Jul. 20, 2001    (DE) ................. 101 35 587

(51) Int. Cl.
*B23H 7/26*    (2006.01)
(52) U.S. Cl. .................... 219/69.2; 219/69.16
(58) Field of Classification Search ........... 219/69.15, 219/69.16, 69.17, 69.2
See application file for complete search history.

(56) References Cited

U.S. PATENT DOCUMENTS

| | | | |
|---|---|---|---|
| 3,354,073 A | * | 11/1967 | Williams, Jr. et al. .. 204/224 R |
| 3,736,647 A | * | 6/1973 | Roeder et al. ............... 228/102 |
| 4,259,562 A | | 3/1981 | Cammann et al. ............ 219/68 |
| 4,361,745 A | * | 11/1982 | Rupert et al. ............ 219/69.16 |
| 4,705,932 A | | 11/1987 | Aso et al. .................. 219/69.2 |
| 5,041,709 A | * | 8/1991 | Schneider et al. ....... 219/69.15 |
| 5,618,449 A | | 4/1997 | Houman et al. .......... 219/69.11 |

FOREIGN PATENT DOCUMENTS

| | | | |
|---|---|---|---|
| DE | 3642775 C2 | | 7/1989 |
| EP | 0464264 | | 1/1992 |
| GB | 2323551 A | * | 9/1998 |
| JP | 03049833 | | 3/1991 |
| JP | 2000-343334 | | 12/2000 |

OTHER PUBLICATIONS

International Search Report.

* cited by examiner

*Primary Examiner*—Geoffrey S. Evans
(74) *Attorney, Agent, or Firm*—Crowell & Moring LLP

(57) ABSTRACT

Spark erosion system for removing connection elements from a structure (W, 60), having a drill head (3) [(4)?], a rotational drive (10) by means of which a tool is caused to rotate, a positioning system (15) for moving the tool as well as a process control (48) for controlling the overall system, the system comprising an energy unit (30) and an electric circuit, and in that, furthermore, the tool is a tube electrode (5) through whose interior (5a) a dielectric can be guided to the surface (61a) of the connection element (61) to be detached, which surface (61a) faces the interior (7a), in order to cause a voltage between the tube electrode (5) and the connection element (61) to be detached, for implementing a spark erosion.

7 Claims, 4 Drawing Sheets ly on drawing rivets as a function of the exercised contact pressure. Another disadvantage is a possible development of heat which arises particularly when the cutting effect of the drill is considerably reduced because of wear or the rivet rotates along with the tool, whereby increased frictional heat is generated and may result in damage to the structure (structural change).
EROSION SYSTEM HAVING AN EROSION HEAD FOR REMOVING METALLIC CONNECTION ELEMENTS

BACKGROUND AND SUMMARY OF THE INVENTION

This application claims the priority of German Patent Document No. 101 35 587.4, filed 20 Jul. 2001, and PCT/DE02/02670, filed 22 Jul. 2002 the disclosure of which is expressly incorporated by reference herein, respectively.

The invention relates to an erosion system having an erosion head for removing metallic connection elements.

Up to now, core hole drills, which centrically cut away the connection element, for example, the rivet, have been used for removing connection elements. This drilling method has the disadvantage that structural parts, which are held together by the connection elements, may be damaged. This applies particularly to the removal of rivets because the latter have to be drilled out to the transition point situated between the rivet head and the rivet neck and this is the point of contact of the structural parts connected by means of the rivet.

Furthermore, in the airplane construction field, coupling rivets with high-strength drawing mandrels are used at points which are accessible only on one side. As a result, a very hard material is present specifically in the center of the rivet, whereby the following additional problems occur: The quality of the centering, that is, the precision with which the drill is applied, depends on the craftsman's manual skill, which, however, results in a scatter with relatively inexact centerings. In addition, the tool, that is, the drill, wears away particularly intensively on drawing rivets as a function of the exercised contact pressure. Another disadvantage is a possible development of heat which arises particularly when the cutting effect of the drill is considerably reduced because of wear or the rivet rotates along with the tool, whereby increased frictional heat is generated and may result in damage to the structure (structural change).

For these reasons, this drilling method has a limited suitability also for the removable of coupling rivets with drawing mandrels.

Apart from the above-mentioned technical problems, this drilling method results in very high physical stress to the implementing craftsman, which additionally impairs the quality of the process.

It is an object of the invention to provide a drilling method as well as a system for implementing the method by means of which a removal of connection elements from structural parts can be achieved which is as economical as possible, and the structural parts remain undamaged in a manner which is as reliable as possible.

This object is achieved by means of the characteristics of, a rotational drive (10) by means of which a tool is caused to rotate, a positioning system for moving the tool as well as a process control for controlling the overall system, the system comprising an energy unit and an electric circuit and, furthermore, the tool being a tube electrode through whose interior a dielectric can be guided to the surface of the connection element to be detached, the surface facing an interior portion, in order to cause a voltage between the tube electrode and the connection element to be detached, for implementing a spark erosion, characterized in that the rotational drive for the rotation of the tube electrode is arranged in a linearly movable application carriage and a positioning sensor system is provided on the drill head for determining the position of the drill head relative to the connection element, in that at least one video camera is provided which has a pertaining monitor unit with an image processing unit, for positioning the drill head and for controlling the chemical-mechanical erosion process, in that the process control has a laser spacing sensor in connection with an erosion control unit for controlling the position of the drill head relative to the connector surface (S) by way of the position of the application carriage as well as for controlling the signals transmitted to the energy unit, for determining the pulse durations, the average amplitude levels and amplitude maxima as well as the pulse separations of the erosion current.

It is an advantage of the system according to the invention and of the method according to the invention respectively that the process times as well as the tool wear can be reduced. Furthermore, the system according to the invention and the method according to the invention respectively permit an ergonomically advantageous operating sequence without any unusual physical stress to the implementing craftsman.

The invention will be described by means of the attached figures.

DETAILED DESCRIPTION OF THE PREFERRED EMBODIMENT

Figure 1:
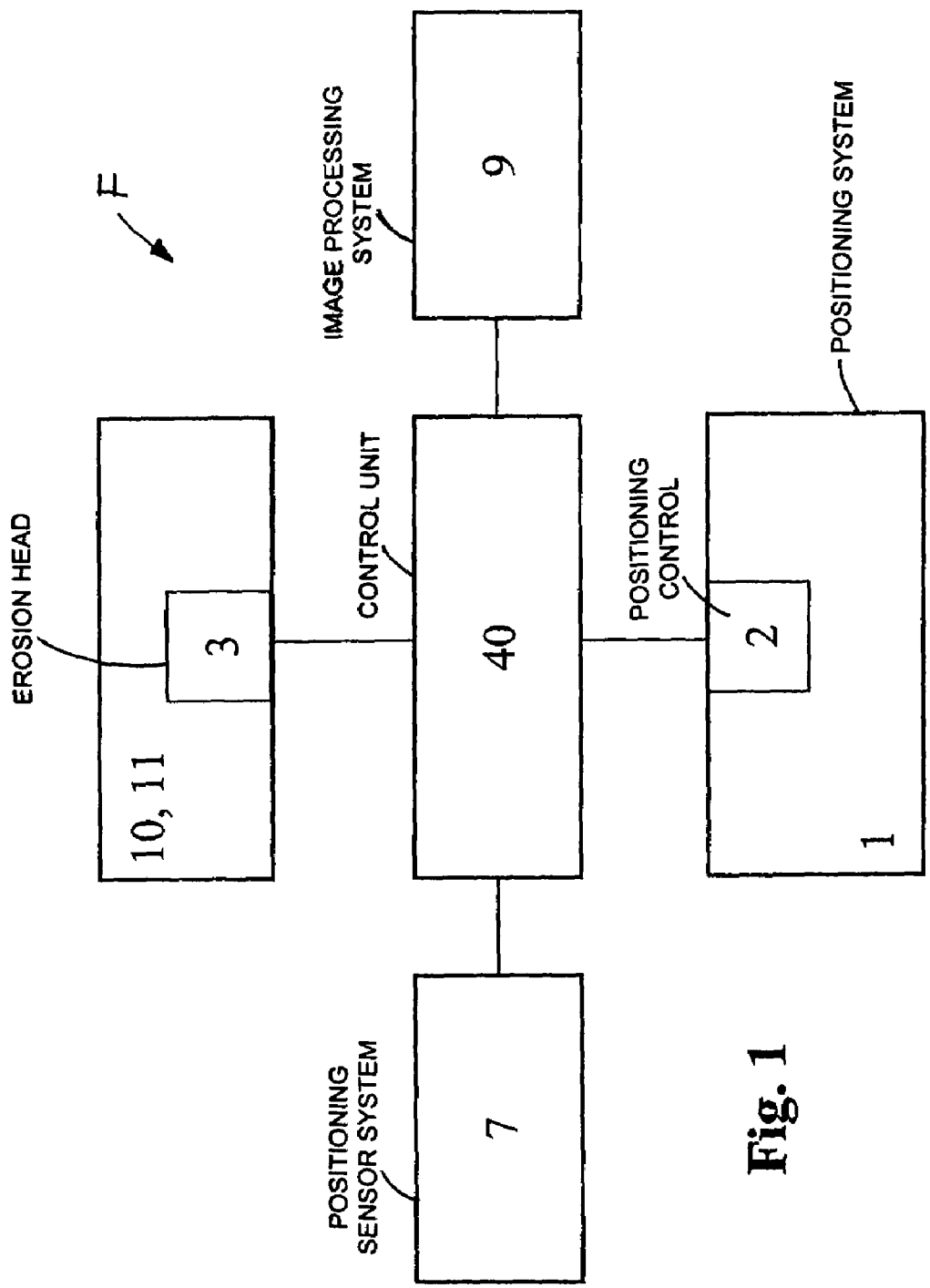
FIG. 1 is a schematic overview of the main functions or main components of the spark erosion system according to the invention with a positioning device and a spark erosion device.
Figure 2:
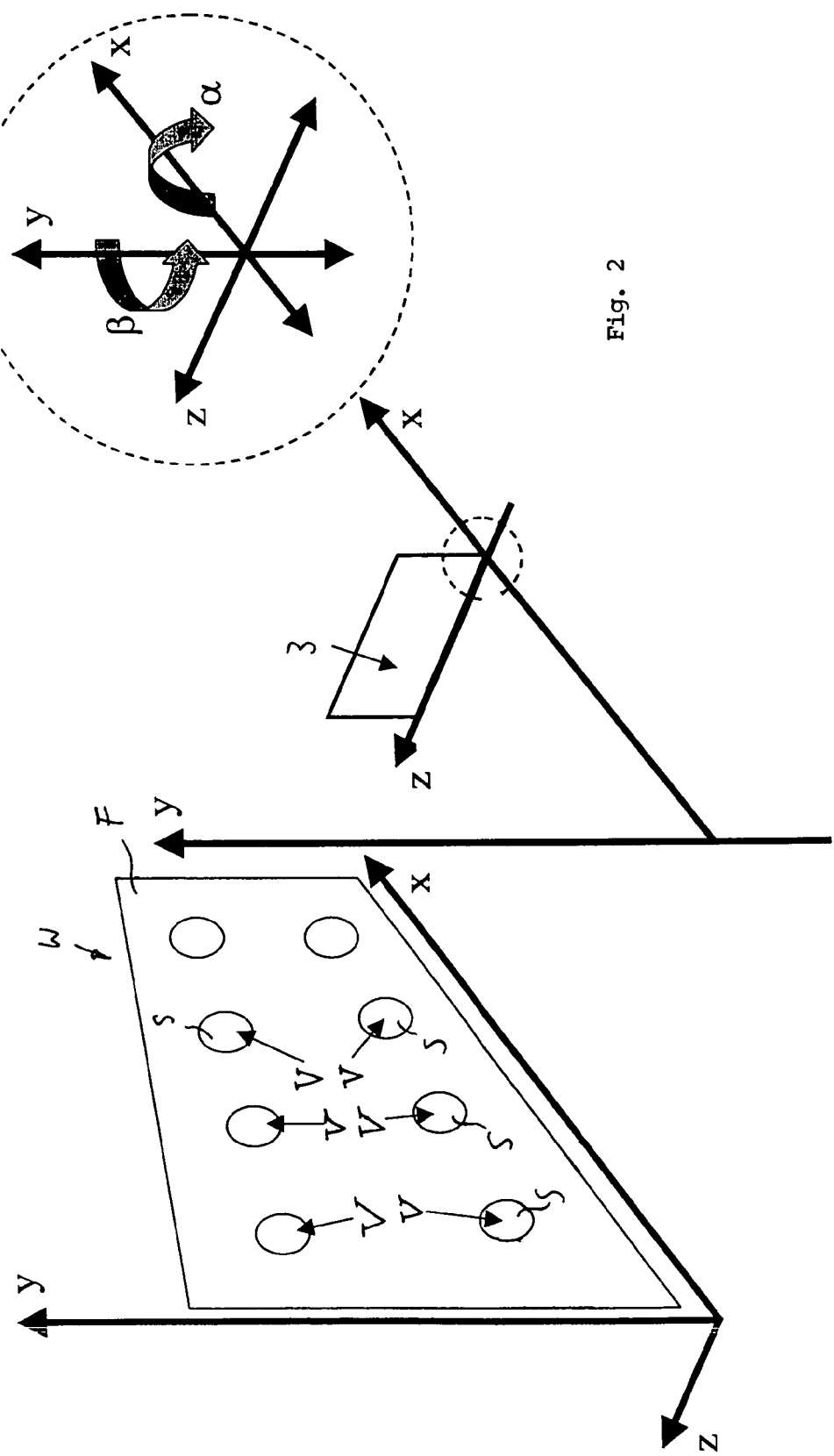
FIG. 2 is a representation of the moving directions which are provided by the positioning device with respect to positions of connection elements in a workpiece.

The spark erosion system F (FIG. 1) according to the invention for removing metallic connection elements comprises a positioning system 1 which, by means of a positioning control 2, positions an erosion head 3 with a drill head 4 three-dimensionally with respect to a connection element V to be detached from a workpiece W. In FIG. 2, the structure surface facing the drill head 4 has the reference symbol F and the surface of the connection element facing the drill head 4 has the reference symbol S. The drill head 4, which is carried by a drill head carrier 4a, additionally can be adjusted during the erosion process by means of a rotational drive 6 and a linear application unit 5 in three translatory and two rotatory moving directions, thus, in a total of five degrees of freedom, the erosion axis being identical with the extension of the application axis of the linear application unit 5.

A positioning sensor system 7 is arranged on the drill head 4, by means of which sensor system 7 a determination of the position of the drill head 4 relative to the respective connection element V to be removed can be carried out. The positioning sensor system 7 is preferably implemented as a surface sensor and particularly as a laser sensor and may additionally have a video camera. When a video camera is used, preferably an image processing unit 9 is assigned to the positioning sensor system 7, by means of which image processing unit 9 the detection of the position of the connection elements V can be improved by an improved detection of the connection element geometry. Optionally, the video camera can also be provided for controlling the chemical-mechanical erosion process. The controlling of the positioning system 1 on the basis of data from the positioning sensor system and optionally of the image processing unit 9 is carried out by the positioning control 2. In this case, the required parameters for the relative alignment of the drill head carrier 4a with respect to the workpiece W or to the connection element V are detected by the positioning sensor system 7. When using the image processing unit 9, the precise positioning takes place by means of an image detection sensor system in the form of, for example, at least one camera module, and a suitable image processing system, the image detection sensor system preferably being fastened on the drill head carrier 4a. If a video camera is provided, it is connected with a control monitor 9a by way of a video signal cable 9b. However, instead of the video camera 9, any other type of expedient control device can be provided for controlling the coarse positioning. The advantage of the use of a video camera is that the latter can also be used for controlling the erosion process.

When two camera modules are used, the first camera module permits the detection of a larger number of connection elements or connectors V, which can be used by way of a separate monitor also for the coarse orientation and positioning of the drill head 4 with respect to the workpiece W. By means of a second camera module, the individual connection elements V for the image processing system are optically detected. By means of these image data, the image processing system determines the connector center and defines the coordinates which are stored and by way of which the drill head can at any time again be placed over the once detected connector.

When only one camera module is used, the described functions can also be carried out by this one camera module. However, more than two camera modules can also be provided to which the described functions can be distributed in an expedient manner.

The actual removal of the connectors takes place by a spark erosion system 10 with the erosion head 3 and stationary equipment 11. The erosion head 3 prepares the connection element V by a weakening or through-erosion of the shaft of the connection element V to such an extent that the latter can then be removed by being knocked out or pulled out. The controlling of the erosion head 4 takes place by means of an erosion control unit 13.

Figure 3:
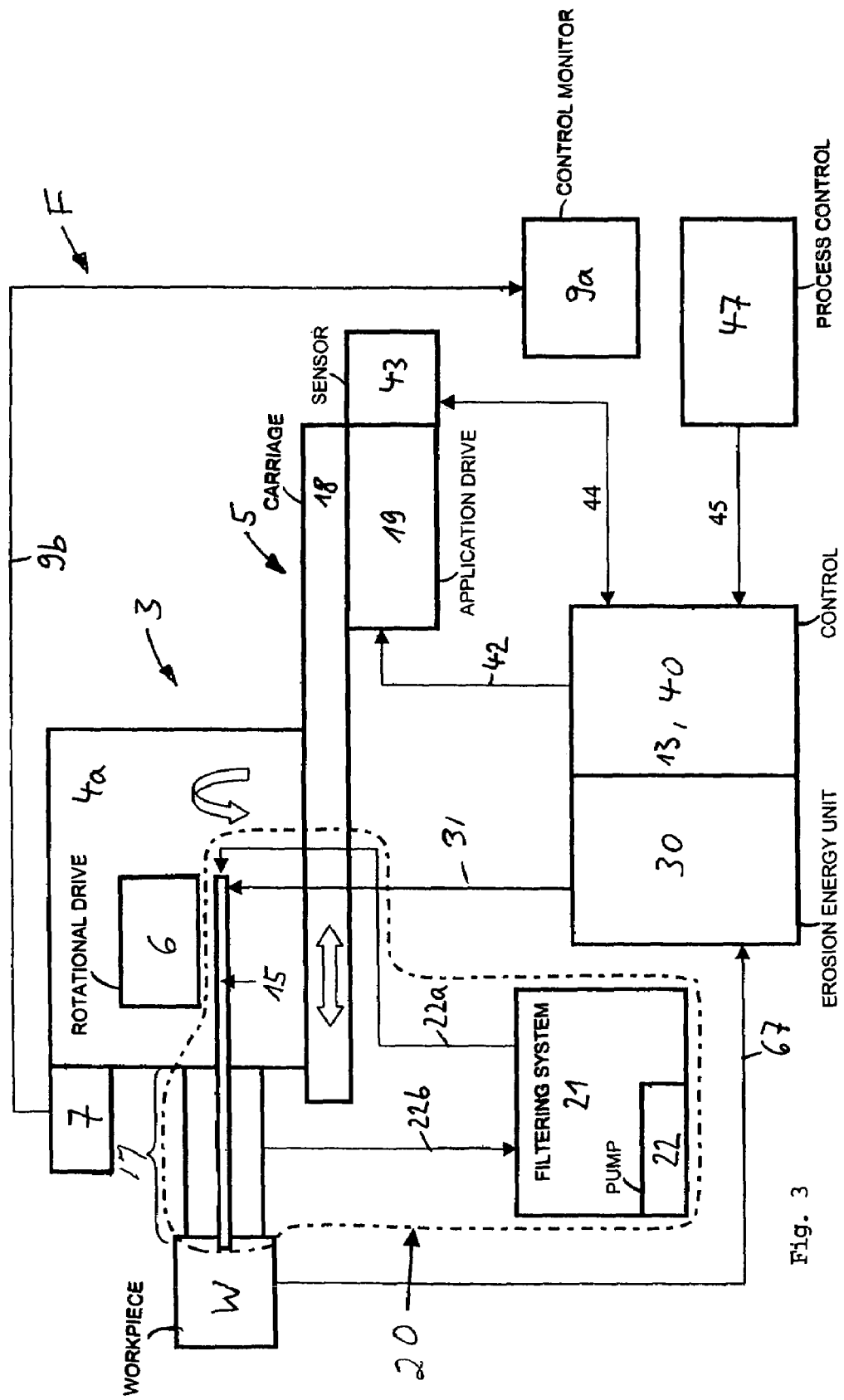
FIG. 3 is a functional diagram of the spark erosion device.

For carrying out the actual erosion process, the spark erosion system (FIGS. 2 and 3) comprises the erosion head 3 with a rotatable tube electrode 15 and a rinsing cage 17. The rotational drive 6 is provided for carrying out the rotation of the tube electrode 15. The rotational drive 6 with the drill head 3 is disposed on an application carriage 18 of the linear application unit 5 which, for its driving, also has an application drive 19. Controlled by the erosion control unit 13, the advancing of the tube electrode 15 is carried out in the z-direction (FIG. 2) by means of the application drive 19. The rotational drive 6 permits rotating movements of the drill head 4 about two axes extending perpendicular to one another; in the view of FIG. 2, about the vertical or x-axis and about the horizontal or y-axis. As a result of the rotation about the x-axis, an adjusting angle □ is obtained, while, as a result of the rotation about the y-axis, an adjusting angle □ of the erosion head 3 is obtained.

By means of the positioning system 1, the erosion head 3 can be positioned in the y-direction and the x-direction. This preferably takes place before the actual erosion process. For this purpose, the positioning system 1 can be implemented by a surface portal with two linear axes in the x-direction and the y-direction. However, other positioning devices according to the state of the art can also be used. By prepositioning the erosion head 3 by means of the positioning system 1, the erosion head 3 is moved to a suitable point of the surface S of the connection element V to be removed, from which the erosion process can start. When the repositioning of the erosion head 3 has taken place, the positioning system is first stopped until, as required, corrections are still made during the erosion process. In connection with this prepositioning, the erosion head 3 is additionally aligned by means of the rotational drive 6 in order to also carry out a suitable alignment of the erosion head 3 before the beginning of the erosion process. According to the invention, this prepositioning is automatically carried out by means of the positioning sensor system, optionally by means of the image processing unit 9 as well as by means of the positioning control 2 but can also take place semi-automatically or manually.

In the following, the preferred design of the positioning system 1 as a surface portal will be described:

The surface portal has a linear x- and a y-axis, whereby the drill head 4 and the erosion head 3 respectively can be moved parallel to the workpiece surface of the workpiece W and particularly with respect to the head or the surface S of the connection element V to be removed in the workpiece W. The approaching of the drill head 4 to the workpiece W takes place by way of another linear axis which is preferably rotatably disposed around the x- and y-axis of the portal system. The position orientation of the drill head 4 relative to the workpiece W (orthogonally to the structure surface F) is determined by way of three laser spacing sensors which are fastened on the drill head carrier, parallel to the axis of the electrode 15 arranged on the erosion head 3. This method is used particularly when the connection element is accessible from the side of the workpiece W opposite the erosion system such that the workpiece W has to be weakened by the erosion of a groove only to such an extent that it can subsequently be knocked out toward the rear. When this accessibility toward the rear viewed from the erosion system is absent, the complete connector shaft has to be eroded through, so that the connection element V can be pulled out toward the front. For this purpose, another laser spacing sensor, preferably a point laser, is used in the described embodiment, by way of which the drill head 4 is aligned relative to the connector surface S in order to be able to exactly axially follow the course of the connector shaft during the erosion.

By means of the positioning system of the described type, a workpiece surface of approximately 2.7 m×2.7 m can be machined, in which case a positioning precision of ±0.1 mm can be reached.

The technical implementation of the positioning system may comprise various combinations of local and global positioning activities (maximizing, miniaturizing).

Depending on the position and location of the workpiece W with the connection elements V to be removed or to be eroded, corrections in the alignment of the erosion head 3 or of the electrode by means of the rotational drive 6 or in the x- or y-direction may become necessary during the erosion process. These corrections can also take place during the erosion process, for which also the positioning sensor system 7, optionally the image processing unit 9 and the positioning control 2 can be used.

In addition to this preferred embodiment, instead of or in addition to the positioning system 1 and the rotational drive 6, according to the invention, other movement mimicries according to the state of the art can also be provided for the positioning and alignment of the erosion head 3 in the described fashion.

The rinsing cage 17 is a component of a rinsing system 20 which also comprises a filtering system 21 and a pump 22. By means of the pump 22, a medium, which is used as the dielectric, is fed by way of a feeding pipe 22a to the rinsing cage 17. From this rinsing cage 17, the medium can again be fed to the filtering system 21 by means of a suction pipe 22b. The filtering system 21 is used for cleaning the dielectric, while the pump 22 is used for feeding the dielectric by means of a sufficient pressure to the rinsing cage 7.

An erosion energy unit 30 is provided which, by way of a line 31, sends erosion current to the electrode 15 by which the erosion process is caused on the workpiece. An erosion control unit 40 controls the erosion process. By way of a command line 42, it supplies command signals to the application drive 19. This can be caused by way of a regulating function integrated in the control unit 40, which receives as a regulating variable the position of the application carriage 18 causing the electrode advance. For this purpose, a sensor 43 is provided which taps the position. By means of the signal line 44, the actual position of the linear axis or of the drill head is fed to the control unit 40 which, by means of a regulator, emits commands for the application drive 16. The sensor 43 may, for example, be designed as a rotation sensor and may be connected with the application drive 19.

By way of an input line 45, the control unit 40 is connected with an input unit of the process control 47, by means of which process definitions can be entered into the control unit 40 for designing the erosion process. The erosion control unit transmits control signals to the erosion energy source 30 by means of which the intensity and the course of the erosion current or slot current is determined and controlled; for example, the pulse lengths, the average amplitude levels and amplitudes maxima or the pulse separations of the erosion current. In this case, different parameters can be included, such as the electrode material, the workpiece material and size or the used dielectric. The control definitions determined by the erosion control unit represent an optimum for the current to be supplied by the erosion energy source.

The rinsing cage 17 (FIG. 3) closes off and interior space 17a around the connection element V disposed in the workpiece W in an area of the tube electrode 15. A dielectric is fed to the space 17a by way of a feeding pipe 22a. De-ionized water with a conductivity of preferably from 10 to 60 µS/cm is preferably used as the dielectric, but, depending on the application, also beyond this range. During the operation of the spark erosion system, the space 17a is almost completed filled with a dielectric. In order to seal off the space 17a against the exit of dielectric, on the one hand, a sealing device 62 is provided between the rinsing cage 17 and the tube electrode 15 as well as a sealing device 63 is provided for sealing off the rinsing cage 7 with respect to the workpiece W or the structure.

Figure 4:
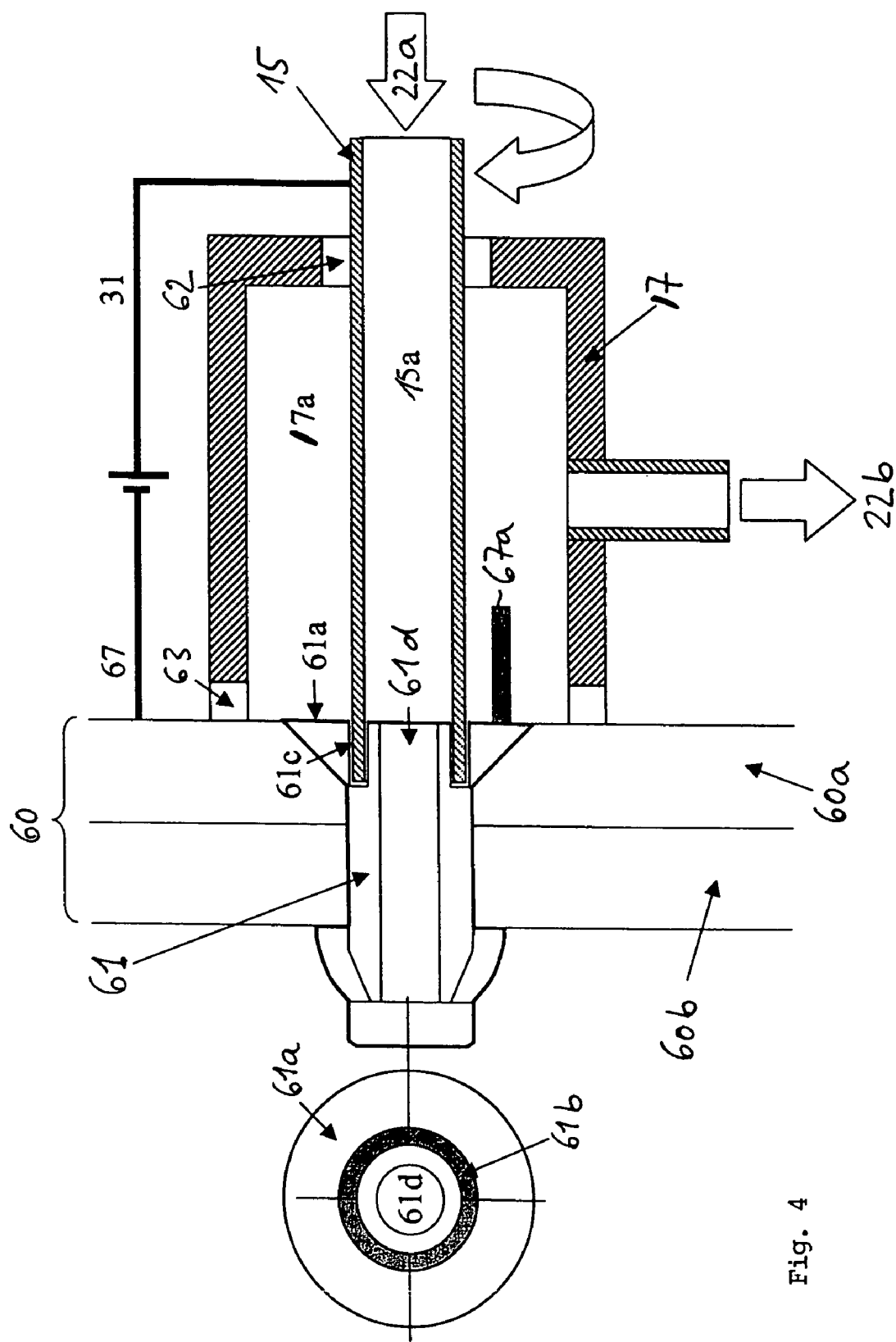
FIG. 4 is an axial sectional view of an arrangement consisting of a drill head, of a variant of the electric circuit as well as of a connection element provided for the machining with a part of the structural parts connected by the latter.

The workpiece W may comprise several structural parts in the area of the connection element V. In FIG. 4, the workpiece or the structure has the reference number 60, and the connection element has the reference number 61. If, for example, the connection element 61 is a rivet, the structure 60 may normally comprise a covering 60a and a substructure 60b, such as a frame in an airplane structure. The rinsing cage 17 is arranged such that the point on the structure 60 at which the connection element 61 is arranged can be completely surrounded by dielectric. The rinsing cage 17 therefore has to enclose the entire connection element 61 on the side of the tube electrode 15. By means of this variant of the above-described sealed-off point rinsing, the erosion process can be carried out in any spatial location of the workpiece 61 or of the drill head 4.

It is an advantage of this design of the rinsing system 20 that it permits a sealed-off, location-independent erosion of the connection element V by point rinsing with ground contacting at the connection element.

The tube electrode is rotatably arranged with respect to the rinsing cage 17 as well as with respect to the connection element 61 and projects through the rinsing cage 17. The grounding conductor 67 is connected to the workpiece 60. As an alternative, it can be connected with the connection element (FIG. 4) by way of a special contacting 67a. According to the invention, the latter case is to be provided when the structure 60 is only poorly or not at all electrically conductive; thus is, for example, a carbon-fiber-reinforced plastic structure. The interior space 15a of the tube electrode 15 is charged with the dielectric by way of the feed pipe 22a, which dielectric is guided to the surface 61a or S (FIG. 2) of the connection element 61 or V, which surface 61a faces the tube electrode 5.

FIG. 4 shows a condition in which, as a result of the erosion process, the tube electrode 15 has already formed ring grooves 61b in the connection element 61. It is also shown that a space 61c is forming between the ring groove 61b and the tube electrode 5. The dielectric situated in the interior 7a flows through the space 61c into the space 17a of the rinsing cage 17 in order to be able to be guided by way of the suction pipe 22 to the filtering system 21. The dielectric coming out of the space 61c carries erosion material along with it which was created in the erosion process out of the connection element 61. In this manner, erosion material is removed from the machining site by way of the pipe 22b.

The tube electrode 15 is caused to rotate by means of the rotational drive 6 for the erosion process in order to prevent an uneven wearing of the workpiece-side surface of the electrode. This is particularly important when the surface 61a of the connection element before the erosion process has an uneven surface, for example, provided with grooves. During the operation, the electrode 15 is first applied axially parallel to the connection element 61 to be detached or surface-orthogonally to the structure 60. This takes place by way of the sensor system 7 which, for this purpose, is preferably implemented as a laser spacing sensor system. The tube electrode 15 is caused to rotate and the pump 22 is switched on in order to charge dielectric into the interior 15a of the tube electrode 15. As a result, the dielectric flows from the filtering system 21 by way of the feed pipe 22a through the interior 5a of the tube electrode and the space 61c into the interior 7a and subsequently by way of the suction pipe 22b back into the filtering system 21.

The process steps of the erosion process according to the invention are as follows:

For preparing the actual erosion process, a ground connection to the workpiece or to the connection element is to be established by means of the special contact 67a; the level of the dielectric is to be controlled in the rinsing system 20, or dielectric is to be refilled; and an electrode type which is suitable for the connector type to be removed and has a suitable diameter is to be clamped into the drill head 4.

By means of the positioning system 1, the drill head 4 is then aligned with respect to the connection element V or 61 to be removed, and, as required, the electrode 15 is centered by means of the image processing unit 9 with respect to the surface S or 61a of the connection element V or 61 as well as required precision corrections are carried out. Subsequently, the actual erosion process is implemented.

As required, eroded connection elements may be removed by through-punching.

These steps can be repeated on additional connection elements.

According to the invention, a spark erosion system is provided for removing connection elements from a structure, which spark erosion system has a drill head 3, a rotational drive 10 by which a tool is caused to rotate, a positioning system 15 for moving the tool as well as a process control 48 for controlling the overall system, the system comprising an energy unit 30 and an electric circuit and, furthermore, the tool is a tube electrode 5 through whose interior 5a a dielectric can be guided to the surface 61a of the connection element 61 to be detached, which surface 61a faces the interior 17a, in order to cause a voltage between the tube electrode 5 and the connection element 61 to be detached, for causing a spark erosion. For the rotation of the tube electrode, the rotational drive 10 is arranged on a linearly movable application carriage, and a positioning sensor system is provided on the drill head for determining the location of the drill head relative to the connection element. At least one video camera with a pertaining monitor unit and with an image processing unit is provided for positioning the drill head and for controlling the chemical-mechanical erosion process. The process control 48 preferably has a laser spacing sensor in connection with an erosion control unit 40 for checking or controlling the position of the drill head 4 relative to the connector surface S by way of the position of the adjusting carriage 18. In this case, a sensor can also be used by means of which the connector surface S is detected, such as a camera. In cooperation with the erosion control unit 40, the electrode can automatically, that is, by way of corresponding control functions, be held in a desired position relative to the connector. By way of desired data information or by way of control functions, the erosion control unit 40 determines signals which are transmitted to the energy unit (30). By means of these signals, particularly the pulse durations, the average amplitude levels and amplitude maxima as well as the pulse separations of the erosion current are defined which is supplied by the erosion energy source 30 for implementing the spark erosion.

The invention claimed is:

1. A spark erosion system for removing connection elements from a structure, said system comprising:
    a drill head;
    a rotational drive for rotating a tube electrode said rotational drive arranged in a linearly movable application carriage;
    a positioning system for moving said tube electrode wherein said tube electrode has an interior which serves as a guiding means for guiding a dielectric to a surface of a first connection element to be detached, said surface facing an interior portion of the system;
    an energy unit and an electric circuit providing a voltage between the tube electrode and the connection element to be detached in order to implement spark erosion, wherein said positioning system includes a sensor on said drill head for determining a position of the drill head relative to the connection element; and
    at least one video camera including a control unit and an energy processing unit for positioning the drill head and for controlling the erosion process wherein the control unit includes a laser spacing sensor and an erosion control unit for controlling the position of the drill head relative to a connection surface by means of a position of the application carriage as well as controlling the signals transmitted to the energy unit for determining pulse durations, average amplitude levels and amplitude maxima and pulse separations of an erosion current.

2. The spark erosion system for removing connection elements according to claim 1, wherein, by means of a rinsing cage and a sealing device, a space around a surface of the connection element to be detached is sealed off and the dielectric can flow around an area of a surface (S) of the connection element to be detached on the side of the tube electrode or on a portion of the tube electrode.

3. The spark erosion system for removing elements according to claim 1, further including and, a sensor system is provided on the drill head for positioning the drill head (4) relative to the connection element.

4. The spark erosion system for removing connection elements according to claim 1, further including an erosion control unit which, together with a sensor system, permits the controlling of an erosion process.

5. An arrangement for removing connection elements from a structure, comprising:
    a drill head having a sensor system to control an extent of erosion procession of a connecting element;
    a tube electrode having an interior portion;
    rotating device for rotating said tube electrode about two axes perpendicular to one another;
    device for guiding a dielectric through the tube electrode to a surface of a connection element to be detached;
    voltage device for causing a voltage between the tube electrode and the connection element to be detached in order to provide a spark erosion.

6. The arrangement according to claim 5, further including a process control means for controlling the function arrangement and wherein said positioning system moves said tube electrode.

7. The arrangement according to claim 5, further including a rinsing cage and sealing device whereby a space around a surface of the connection element to be detached is sealed off whereby the dielectric can flow around an area of a surface of the connection element to be detached on the side of the electrode or on a portion of the tube electrode.

* * * * *